United States Patent
Hiriyannaiah et al.

(10) Patent No.: US 8,682,946 B1
(45) Date of Patent: Mar. 25, 2014

(54) ROBUST PEAK FINDER FOR SAMPLED DATA

(75) Inventors: Harish P. Hiriyannaiah, San Jose, CA (US); Donald D. Walker, San Jose, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 15 days.

(21) Appl. No.: 13/116,558

(22) Filed: May 26, 2011

(51) Int. Cl.
*G06F 7/00* (2006.01)

(52) U.S. Cl.
USPC .......................................... 708/207; 708/200

(58) Field of Classification Search
None
See application file for complete search history.

(56) References Cited

U.S. PATENT DOCUMENTS

| | | | |
|---|---|---|---|
| 6,816,614 B1 * | 11/2004 | Desplats et al. | 382/170 |
| 2006/0150129 A1 * | 7/2006 | Chiu et al. | 716/4 |
| 2006/0253267 A1 * | 11/2006 | Bonvicini | 702/181 |

* cited by examiner

*Primary Examiner* — Michael D Yaary
(74) *Attorney, Agent, or Firm* — Suiter Swantz pc llo

(57) ABSTRACT

A method for determining a peak value of a histogram or a sequence of sampled data is disclosed. The method may include fitting a curve to the sequence of data, the curve being modeled based on an orthonormal expansion; obtaining a differential curve, the differential curve describing changes in slope of the curve fitted to the sequence of data; finding at least one root for the differential curve; for each of the at least one root for the differential curve, calculating a corresponding value on the curve fitted to the sequence of data; and determining the peak value of the sequence of data based on a maximum value among the corresponding value calculated for each of the at least one root.

20 Claims, 2 Drawing Sheets

US 8,682,946 B1

ROBUST PEAK FINDER FOR SAMPLED DATA

TECHNICAL FIELD

The disclosure generally relates to the field of data analysis, particularly to a robust peak finder for sampled data.

BACKGROUND

Sampled data and histograms have been utilized for showing data distributions in various applications. Some applications may also need to detect/find the peaks of such sampled data for various purposes. While some existing peak detection methods may be utilized in certain applications, they may be prone to errors and biases, especially when applied to noisy data. Therein lies a need for a robust peak finding method.

SUMMARY

The present disclosure is directed to a method for determining a peak value of a histogram or a sequence of sampled data. The method may include fitting a curve to the sequence of data, the curve being modeled based on an orthonormal expansion; obtaining a differential curve, the differential curve describing changes in slope of the curve fitted to the sequence of data; finding at least one root for the differential curve; for each of the at least one root for the differential curve, calculating a corresponding value on the curve fitted to the sequence of data; and determining the peak value of the sequence of data based on a maximum value among the corresponding value calculated for each of the at least one root.

The method may also include determining a peak position, the peak position being determined based on a particular root of the at least one root that corresponds to the peak value; estimating a standard deviation of the curve fitted to the sequence of data; and determining a confidence interval based on the peak position and the standard deviation.

An additional embodiment of the present disclosure is directed to a computer-readable device having computer-executable instructions for performing a peak finding method on a sequence of data. The said method may include fitting a curve to the sequence of data, the curve being modeled based on an orthonormal expansion; obtaining a differential curve, the differential curve describing changes in slope of the curve fitted to the sequence of data; finding at least one root for the differential curve; for each of the at least one root for the differential curve, calculating a corresponding value on the curve fitted to the sequence of data; and determining a peak value for the sequence of data based on a maximum value among the corresponding value calculated for each of the at least one root.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
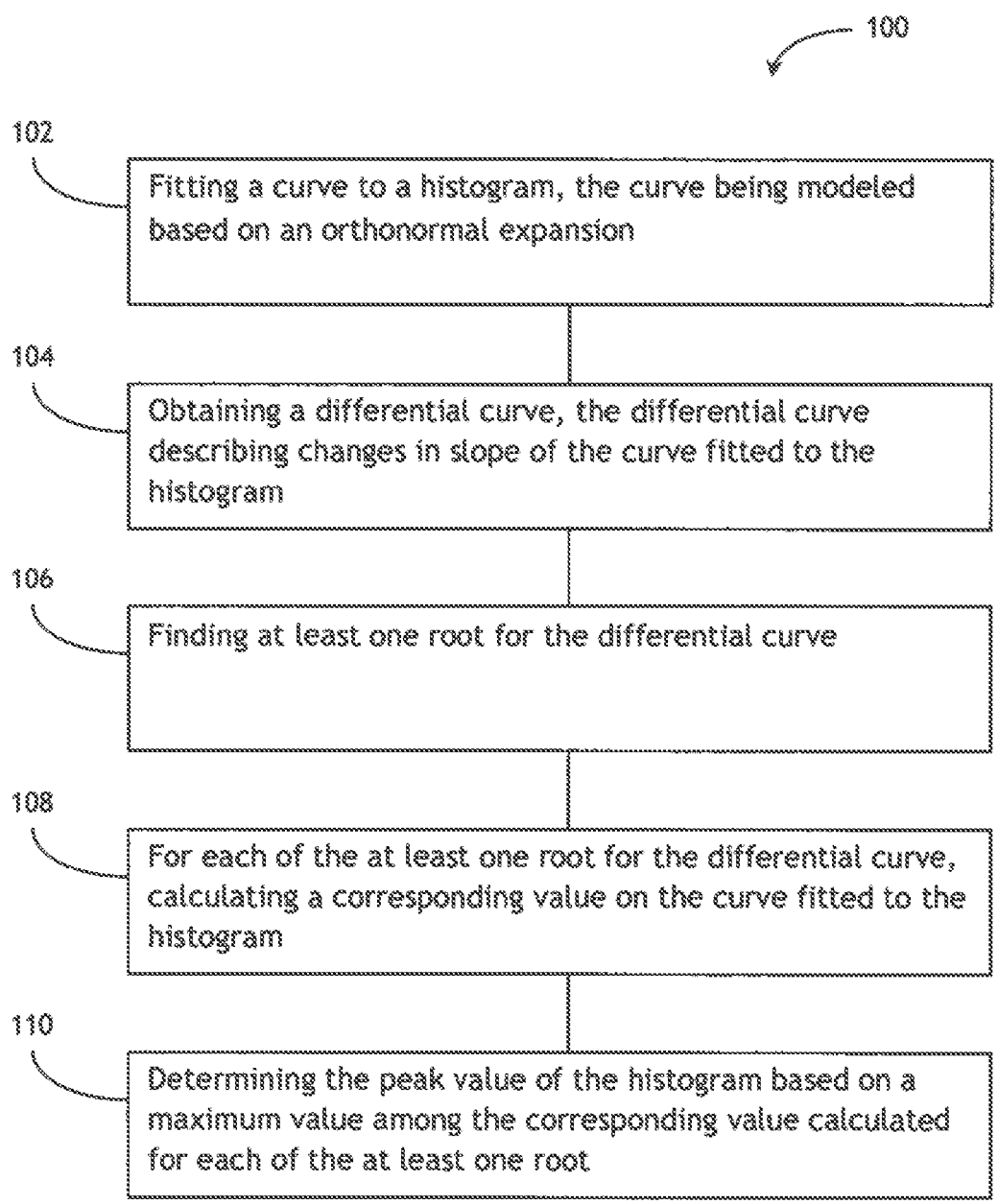
FIG. 1 is a flow diagram illustrating a peak finding method.
Figure 2:
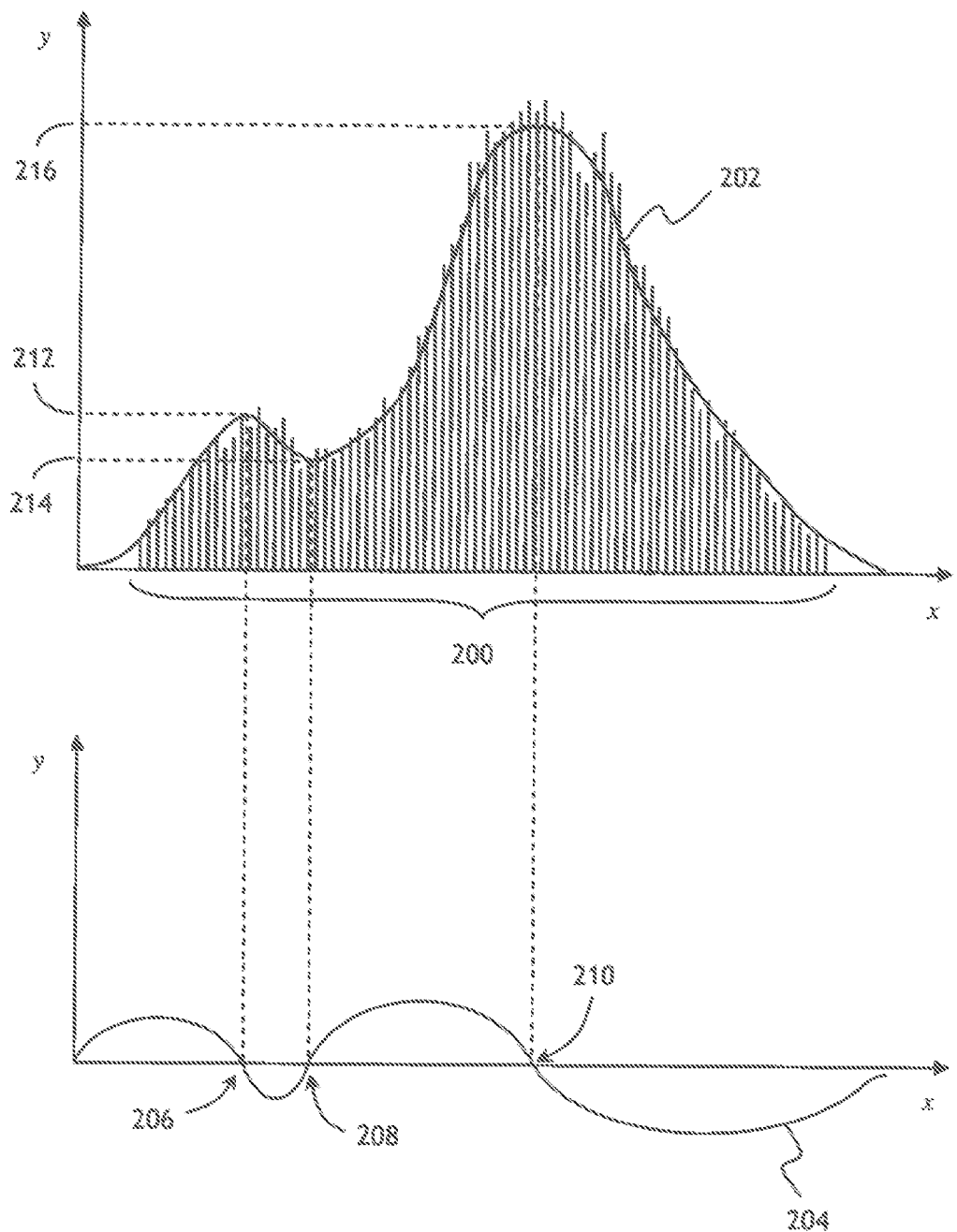
FIG. 2 is an illustration depicting a curve fitted to a noisy histogram and a differential curve describing changes in slope of the curve fitted to the histogram.

Referring to FIGS. 1 and 2, a method 100 for determining a peak value of a histogram 200 is shown. It is contemplated that the data representing the histogram 200 may be provided to the method 100 as a database table, a spreadsheet, comma separated values, a sequence of data or various other data representations. Upon receiving the histogram, step 102 may start the process to fit a curve 202 to the histogram 200.

In one embodiment, the histogram data is fitted using least squares approximations or other error norm based approximations to a curve 202 modeled as an orthonormal expansion. For instance, let y(x) denote the curve 202, which may be represented as:

$$y = \sum_{i=1}^{n} c_i \varphi_i(x)$$

Wherein $c_i$ represents the coefficients to be determined, and $\varphi_i(x)$ represents an orthonormal function sequence, which forms an orthonormal basis for the function y(x). Utilizing orthonormal function sequence as the basis provides a numerically robust representation for the curve 202, which may be appreciated especially when applied to noisy data. It is contemplated that any orthonormal function sequence may potentially be utilized as the basis for the function y(x). While the Legendre polynomials are utilized as the basis for the function y(x) in one specific implementation, other orthonormal polynomial sequences such as the Hermite polynomials, Chebyshev polynomials, Laguerre functions, Bessel functions or the like may be utilized without departing from the spirit and scope of the present disclosure.

It may be appreciated that the method 100 in accordance with the present disclosure does not impose any restrictions on the sampling interval of the sampled data set. That is, uniform sampling is not required. Furthermore, there is no restriction that the expansion utilized as the basis for the curve is an orthonormal expansion. Non-orthogonal functions may be utilized as well, however, they may not be as robust when applied to certain data sets.

While the function y(x) described above may be calculated as an infinite series, however, it may be truncated to the $n^{th}$ order in practice (i.e., to the $n^{th}$ order orthonormal decomposition). For instance, the function may be truncated to the $10^{th}$ order if it is determined that including orthonormal polynomials of higher orders may not provide any significant value in the curve fitting process. For example, if including orthonormal polynomials of higher orders in the function y(x) do not improve the accuracy of the curve 202 (e.g., may be measured as the percentage of the sampled data described by the curve), then the function may be truncated. In another example, if the curve 202 correctly describes a desired percentage (e.g., 95% or more) of the sampled data, then including orthonormal polynomials of higher orders may not be necessary. It is contemplated that the specific value of n may be determined for each particular application based on the desired accuracy of the curve and the acceptable computation complexity. In one embodiment, the specific value of n may be a predetermined value based on the particular application. Alternatively, the value of n may be determined systematically as a parameter of the curve fitting process. It is further contemplated that various curve fitting techniques may be utilized in step 102 to determine the unknown coefficients/parameters.

Once the unknown coefficients/parameters are determined, the method 100 may proceed to locate the peak(s) of the function y (x), which represents the curve 202 that is fitted to the histogram 200. In one embodiment, a differential curve 204 that describes the changes in slope of the curve 202 may be utilized to facilitate the peak detection process. It is understood that the depiction of the differential curve 204 in FIG. 2 is for illustrative purposes; it may not be to scale with respect to curve 202.

The differential curve 204 may be obtained in step 104 by computing the coefficients of the first order derivative of the function y(x), and step 106 may utilize any zero-crossing algorithm (e.g., the Jenkins-Traub algorithm, the Newton Raphson method, the bisection method or the like) to find the root(s) for the differential curve 204. That is, the first order derivative of the function y(x) describes the changes in slope of the function y(x); and finding the root(s) of the first order derivative of the function y(x) will provide a list of peaks, valleys and inflection points of the function y(x).

For instance, in the example depicted in FIG. 2, zero-crossings may occur at positions 206, 208 and 210 on the differential curve 204. These positions, in turn, may indicate where the peaks and valleys may occur on the curve 202. Step 108 may then calculate the corresponding values 212, 214 and 216 on the curve 202 at each of the positions 206, 208 and 210, respectively. In this manner, the maxima among the calculated values may be determined to be the peak value of the histogram 200 in step 110. Furthermore, the particular position that provided the corresponding peak value may be determined to be the peak position (position 210 in this example).

The peak finding method in accordance with the present disclosure may be utilized in various applications. For instance, it may be utilized for calibration purposes in wafer surface inspection systems. One of the primary sensitivity metrics of a wafer surface inspection system is the size of the defect that can be detected. The size of the detected defect may be estimated primarily from a sizing curve, based on the brightness of the defect observed during the wafer surface scanning process. Therefore, it may be appreciated to carefully calibrate the sizing curve against ground truth, which may be a spot or full wafer deposition of PSL or $SiO_2$ spheres of nominal size and known spread.

In one implementation, the calibration process may include obtaining an intensity histogram of defects of known size spread. The peak of the obtained histogram may provide an estimated intensity of the defect, which may be used to calibrate the sizing curve for defect size estimations. It is contemplated that the peak finding method of the present disclosure may be utilized to detect/locate the peak of the obtained histogram for calibration purposes. In one embodiment, the order of orthonormal decomposition of function y(x), for sizing curve calibration purposes, may be between 12 and 15. However, lower or higher orders may be utilized without departing from the spirit and scope of the present disclosure.

It is contemplated that the peak finding method in accordance with the present disclosure may be applicable to other data representations in addition to histograms. For instance, the same set of data may be represented utilizing a histogram, a line chart or the like. The peak finding method may be utilized for finding peaks/valleys of a given sequence of data, but not limited to any particular representation. That is, the peak finding method may proceed by first fitting a curve having an orthonormal basis function y(x) to the sequence of data (whether the data is in a histogram, a line chart, or other types of representations), and the rest of the steps may be carried out on the function y(x) as previously described.

For example, laser annealing may be used on the die edges on the wafers and it may be appreciated to provide a means for monitoring the health of the annealing process. In one implementation, the wafer surface inspection system may be utilized to scan the wafer and the contours (i.e., a line chart) of the die on the wafer may be generated. The peak finding method of the present disclosure may be utilized for finding the peaks in the horizontal and vertical edges of the contours, allowing the peak-peak intervals/distances and the peak widths to be determined systematically for monitoring purposes. In one embodiment, the order of orthonormal decomposition of function y(x), for laser annealing monitoring purposes, may be around 10. However, lower or higher orders may be utilized without departing from the spirit and scope of the present disclosure.

It is understood that the applications described above are merely exemplary. It is contemplated that the peak finding method of the present disclosure may be utilized in various other applications in addition to wafer inspection systems. Furthermore, additional steps may be performed once a peak is located. For example, the standard deviation of a curve fitted to a histogram (or a data sequence) may be estimated, and based on the peak position and the standard deviation, the confidence intervals may be determined accordingly, which may be appreciated in various applications.

It is to be understood that the present disclosure may be implemented in forms of a software package. Such a software package may be a computer program product which employs a computer-readable storage medium/device including stored computer code which is used to program a computer to perform the disclosed function and process of the present disclosure. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

The methods disclosed may be implemented as sets of instructions, through a single production device, and/or through multiple production devices. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the disclosure. The accompanying method claims present elements of the various steps in a sample order, and are not necessarily meant to be limited to the specific order or hierarchy presented.

It is believed that the system and method of the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory.

What is claimed is:

1. A non-transitory computer-readable device having computer-executable instructions stored thereon and executed by a computer system to perform a method for determining a peak value of a histogram, the method comprising:
  fitting a curve to the histogram, the curve being modeled based on an orthonormal expansion;
  obtaining a differential curve, the differential curve describing changes in slope of the curve fitted to the histogram;
  finding at least one root for the differential curve;
  for each of the at least one root for the differential curve, calculating a corresponding value on the curve fitted to the histogram; and
  determining the peak value of the histogram based on a maximum value among the corresponding value calculated for each of the at least one root.

2. The computer-readable device having computer-executable instructions stored thereon and executed by a computer system to perform the method of claim 1, further comprising:
  determining a peak position, the peak position being determined based on a particular root of the at least one root that corresponds to the peak value.

3. The computer-readable device having computer-executable instructions stored thereon and executed by a computer system to perform the method of claim 1, wherein the curve fitted to the histogram is modeled based on at least one of: the Legendre polynomials, the Hermite polynomials, the Chebyshev polynomials, the Laguerre functions, or the Bessel functions.

4. The computer-readable device having computer-executable instructions stored thereon and executed by a computer system to perform the method of claim 1, wherein the differential curve is obtained by computing a first order derivative of the curve fitted to the histogram.

5. The computer-readable device having computer-executable instructions stored thereon and executed by a computer system to perform the method of claim 1, wherein the at least one root for the differential curve is found utilizing at least one of: the Jenkins-Traub algorithm, the Newton Raphson method, or the bisection method.

6. The computer-readable device having computer-executable instructions stored thereon and executed by a computer system to perform the method of claim 1, wherein the histogram is an intensity histogram of defects observed during a wafer surface scanning process and the peak value of the histogram provides an estimated intensity of defect.

7. The computer-readable device having computer-executable instructions stored thereon and executed by a computer system to perform the method of claim 6, wherein the curve fitted to the histogram is modeled based on an orthonormal expansion of between $12^{th}$ and $15^{th}$ order.

8. A non-transitory computer-readable device having computer-executable instructions stored thereon and executed by a computer system to perform a method for determining a peak value of a sequence of data, the method comprising:
  fitting a curve to the sequence of data, the curve being modeled based on an orthonormal expansion;
  obtaining a differential curve, the differential curve describing changes in slope of the curve fitted to the sequence of data;
  finding at least one root for the differential curve;
  for each of the at least one root for the differential curve, calculating a corresponding value on the curve fitted to the sequence of data; and
  determining the peak value of the sequence of data based on a maximum value among the corresponding value calculated for each of the at least one root.

9. The computer-readable device having computer-executable instructions stored thereon and executed by a computer system to perform the method of claim 8, wherein the curve fitted to the sequence of data is modeled based on at least one of: the Legendre polynomials, the Hermite polynomials, the Chebyshev polynomials, the Laguerre functions, or the Bessel functions.

10. The computer-readable device having computer-executable instructions stored thereon and executed by a computer system to perform the method of claim 8, wherein the differential curve is obtained by computing a first order derivative of the curve fitted to the sequence of data.

11. The computer-readable device having computer-executable instructions stored thereon and executed by a computer system to perform the method of claim 8, wherein the at least one root for the differential curve is found utilizing at least one of: the Jenkins-Traub algorithm, the Newton Raphson method, or the bisection method.

12. The computer-readable device having computer-executable instructions stored thereon and executed by a computer system to perform the method of claim 8, further comprising:
  determining a peak position, the peak position being determined based on a particular root of the at least one root that corresponds to the peak value.

13. The computer-readable device having computer-executable instructions stored thereon and executed by a computer system to perform the method of claim 12, further comprising:
  estimating a standard deviation of the curve fitted to the sequence of data; and
  determining a confidence interval based on the peak position and the standard deviation.

14. The computer-readable device having computer-executable instructions stored thereon and executed by a computer system to perform the method of claim 8, wherein the sequence of data represents a contour line of a die on a wafer, and wherein peaks on the contour line of the die are determined for monitoring a laser annealing process.

15. The computer-readable device having computer-executable instructions stored thereon and executed by a computer system to perform the method of claim 8, wherein the curve is modeled based on an orthonormal expansion truncated to a particular order, and wherein the orthonormal expansion is truncated when:
  including orthonormal expansion of an order higher than the particular order does not improve accuracy of the of curve fitted to the sequence of data; or
  the curve modeled based on the orthonormal expansion of the particular order describes at least a desired percentage the sequence of data.

16. A non-transitory computer-readable device having computer-executable instructions stored thereon and executed by a computer system to perform a peak finding method on a sequence of data, said method comprising:
  fitting a curve to the sequence of data, the curve being modeled based on an orthonormal expansion;
  obtaining a differential curve, the differential curve describing changes in slope of the curve fitted to the sequence of data;
  finding at least one root for the differential curve;
  for each of the at least one root for the differential curve, calculating a corresponding value on the curve fitted to the sequence of data; and
  determining a peak value for the sequence of data based on a maximum value among the corresponding value calculated for each of the at least one root.

17. The computer-readable device of claim 16, wherein the differential curve is obtained by computing a first order derivative of the curve fitted to the sequence of data.

18. The computer-readable device of claim 16, wherein said method further comprising:
    determining a peak position, the peak position being determined based on a particular root of the at least one root that corresponds to the peak value.

19. The computer-readable device of claim 18, wherein said method further comprising:
    estimating a standard deviation of the curve fitted to the sequence of data; and
    determining a confidence interval based on the peak position and the standard deviation.

20. The computer-readable device of claim 16, wherein the curve is modeled based on an orthonormal expansion truncated to a particular order, and wherein the orthonormal expansion is truncated when:
    including orthonormal expansion of an order higher than the particular order does not improve accuracy of the of curve fitted to the sequence of data; or
    the curve modeled based on the orthonormal expansion of the particular order describes at least a desired percentage the sequence of data.

\* \* \* \* \*